(12) United States Patent
Schumm et al.

(10) Patent No.: US 10,938,712 B2
(45) Date of Patent: Mar. 2, 2021

(54) COMPUTE NODE CLUSTER BASED ROUTING METHOD AND APPARATUS

(71) Applicant: Intel Corporation, Santa Clara, CA (US)

(72) Inventors: Ken Schumm, Olympia, WA (US);
Sameh Gobriel, Hillsboro, OR (US);
Asif H. Haswarey, Tigard, OR (US);
Tsung-Yuan Charlie Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 778 days.

(21) Appl. No.: 15/433,758

(22) Filed: Feb. 15, 2017

(65) Prior Publication Data

US 2018/0234336 A1    Aug. 16, 2018

(51) Int. Cl.
*H04L 12/703*    (2013.01)
*H04L 12/715*    (2013.01)
*H04L 12/741*    (2013.01)

(52) U.S. Cl.
CPC .............. *H04L 45/46* (2013.01); *H04L 45/28* (2013.01); *H04L 45/745* (2013.01)

(58) Field of Classification Search
CPC .............................. H04L 45/14; H04L 45/745
See application file for complete search history.

(56) References Cited

U.S. PATENT DOCUMENTS

2014/0119193 A1*  5/2014  Anand .................... H04L 45/28
                                                            370/237
2016/0020993 A1*  1/2016  Wu ......................... H04L 43/028
                                                            370/392

OTHER PUBLICATIONS

Mihai Dobrescu et al., "RouteBricks: Exploiting Parallelism to Scale Software Routers", Lausanne, Switzerland, Lancaster, UK and Berkley, US; retrieved Feb. 15, 2017 from https://www.google.com/url?sa=t&rct=j&q=&esrc=s&source=web&cd=3&cad=rja&uact=8&ved=0ahUKEwjVk7CpnoHRAhUI92MKHcn-AXQQFggoMAI&url=http%3A%2F%2Fkfall.net%2Fucbpage%2Fpapers%2Fsosp09.pdf&usg=AFQjCNHK78CjzNhNI5oH0VxWu-0RsBNwHg; 17 pages.

\* cited by examiner

*Primary Examiner* — Aftab N. Khan
(74) *Attorney, Agent, or Firm* — Schwabe, Williamson & Wyatt, P.C.

(57) ABSTRACT

Apparatus and method to facilitate networked compute node cluster routing are disclosed herein. In some embodiments, a compute node for cluster compute may include one or more input ports to receive data packets from first selected ones of a cluster of compute nodes; one or more output ports to route data packets to second selected ones of the cluster of computer nodes; and one or more processors, wherein the one or more processors includes logic to determine a particular output port, of the one or more output ports, to which a data packet received at the one or more input ports is to be routed, and wherein the logic is to exclude output ports associated with links indicated in fault status information as having a fault status to be the particular output port to which the data packet is to be routed.

25 Claims, 10 Drawing Sheets

Non-transitory computer-readable storage medium
902

Programming Instructions or bit streams 904
configured to cause a computer device, in response to execution of the programming instructions or bit streams, to practice one or more operations of the methods described in reference to Figures 1-7

FIG. 9

COMPUTE NODE CLUSTER BASED ROUTING METHOD AND APPARATUS

STATEMENT OF GOVERNMENT INTEREST

This invention was made with government support under contract number FA7000-11-2-0001 awarded by the Department of Homeland Security. The government has certain rights in this invention.

FIELD OF THE INVENTION

The present disclosure relates generally to the technical fields of computing and networks, and more particularly, to data routing management within a networked cluster of compute nodes.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

A data center network may include a plurality of compute nodes, such as, without limitation, processor nodes, storage nodes, input/output (I/O) nodes, server nodes, and the like, each configured to perform one or more particular functions or particular types of functions. In the course of performance of functions by the compute nodes, data packets may be communicated between select ones of the compute nodes. In some embodiments, a subset of the compute nodes within the network may be configured to route data packets between the remaining compute nodes. Such subset of compute nodes may comprise server nodes and may be referred to as a cluster.

While use of a cluster as a router may provide extensible routing capacity and flexibility in routing operations, especially in comparison to hardware-based routers, a cluster may experience one or more faults which may adversely affect routing performance. If and/or when a fault occurs, fault detection and routing management so that the cluster may continue to function as a router may be advantageous.

BRIEF DESCRIPTION OF THE DRAWINGS

Embodiments will be readily understood by the following detailed description in conjunction with the accompanying drawings. The concepts described herein are illustrated by way of example and not by way of limitation in the accompanying figures. For simplicity and clarity of illustration, elements illustrated in the figures are not necessarily drawn to scale. Where considered appropriate, like reference labels designate corresponding or analogous elements.

FIG. 9 illustrates an example non-transitory computer-readable storage media having instructions configured to practice all or selected ones of the operations associated with the processes described herein, according to some embodiments.

DETAILED DESCRIPTION

Figure 1:
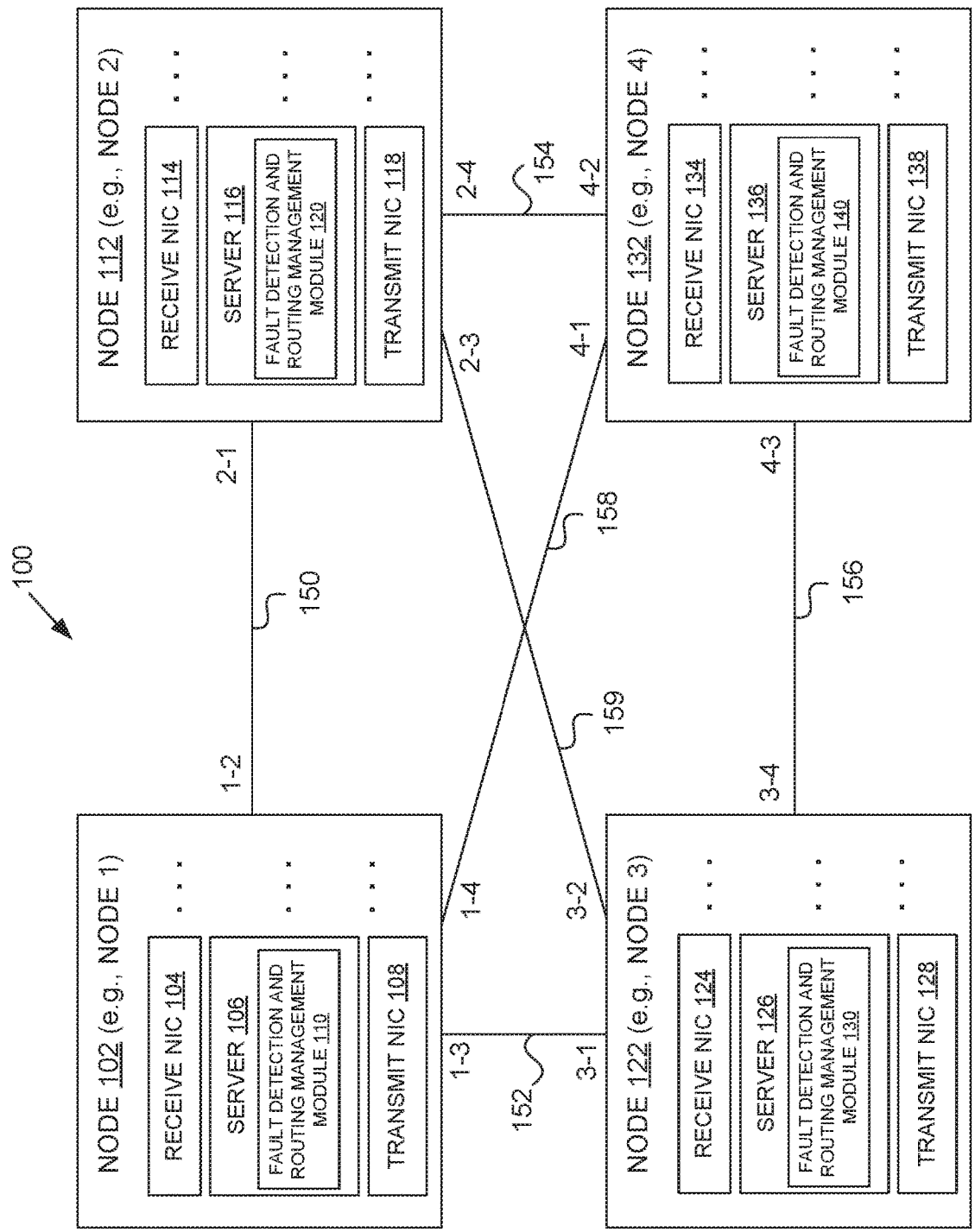
FIG. 1 depicts a block diagram illustrating an example apparatus configured to operate as a router of data packets and incorporated with fault detection and routing management mechanism of the present disclosure, according to some embodiments.

Embodiments of apparatuses and methods related to compute node fault detection and data packet routing management within a networked cluster of compute nodes are described. In some embodiments, a compute node for cluster computing may include one or more input ports to receive data packets from first selected ones of a cluster of compute nodes; one or more output ports to route data packets to second selected ones of the cluster of computer nodes; and one or more processors. The one or more processors may include logic to determine a particular output port, of the one or more output ports, to which a data packet received at the one or more input ports is to be routed based on destination information associated with the data packet, an egress compute node of the cluster being associated with the destination information, and fault status information being associated with links communicatively coupled between respective output port of the one or more output ports and respective compute node of remaining compute nodes of the cluster, and wherein the logic is to exclude output ports associated with links indicated in the fault status information as having a fault status to be the particular output port to which the data packet is to be routed. These and other aspects of the present disclosure will be more fully described below.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 depicts a block diagram illustrating an example apparatus 100 configured to operate as a router of data packets (also referred to as packets) and incorporated with fault detection and routing management mechanism of the present disclosure, according to some embodiments. Apparatus 100 may also be referred to as a cluster, software-based router, router, scalable router, cluster router, cluster of compute nodes, cluster of nodes, cluster of interconnected compute nodes, set of compute nodes, and the like. In some embodiments, apparatus 100 may comprise a plurality of nodes 102, 112, 122, 132 interconnected to each other in a computing fabric or mesh interconnect architecture.

Nodes 102, 112, 122, 132 may also be referred to as compute nodes, fabric nodes, cluster nodes, and the like. As an example, nodes 102, 112, 122, and 132 may also be respectively referred to as node 1, node 2, node 3, and node 4, as shown in FIG. 1. In some embodiments, each of the nodes 102, 112, 122, 132 may include one or more compute components such as, but not limited to, servers, processors, memory, processing servers, and/or the like configured to perform data packet routing functionalities even when one or more faults may exist within the apparatus 100, as described in detail herein. Nodes 102, 112, 122, 132 may comprise server nodes or processor nodes, in some embodiments. A node may comprise a physical compute node, in which its compute components may be located proximate to each other, or a logical compute node, in which its compute components may be distributed geographically from each other such as in cloud computing environments. Similarly, nodes 102, 112, 122, 132 may be geographically proximate or distributed from each other. Nodes 102, 112, 122, 132 may be the same or different from each other. Although four nodes may be depicted in FIG. 1, more or less than four nodes may be included in apparatus 100.

Each node of the plurality of nodes 102, 112, 122, 132 may be communicatively coupled to each of the other nodes of the plurality of nodes 102, 112, 122, 132. For instance, node 102 may be (directly) connected to each of the nodes 112, 122, and 132 via respective interconnect fabric links 150, 152, and 158. Node 112 may be (directly) connected to each of the nodes 102, 122, and 132 via respective interconnect fabric links 150, 159, and 154. Node 122 may be (directly) connected to each of the nodes 102, 112, and 132 via respective interconnect fabric links 152, 159, and 156. And node 132 may be (directly) connected to each of the nodes 102, 112, and 122 via respective interconnect fabric links 158, 154, and 156.

Interconnect fabric links 150, 152, 154, 156, 158, 159 may also be referred to as links. Each of the links 150, 152, 154, 156, 158, 159 may include two ends or end segments, one end coupled to a first node and the other end coupled to a second node. For instance, link 150 between nodes 102 (e.g., node 1) and 112 (e.g., node 2) may include a first end coupled to node 102 (which may be denoted as an end 1-2) and a second end coupled to node 112 (which may be denoted as an end 2-1). The ends of remaining links may be similarly denoted. In some embodiments, links may comprise cables having one or more associated ports.

In some embodiments, node 102 may include, without limitation, one or more receive network interface cards (NICs) 104, one or more servers 106, and one or more transmit NICs 108. The one or more servers 106, in turn, may include fault detection and routing management module 110, which may be configured to detect one or more types of faults associated with the node 102 and/or one or more links coupled to the node 102, as described in detail below. The module 110 may be further configured to determine the traversal path of the data packet from node 102 (or avoidance of node 102) in accordance with the type of fault(s) detected, so that routing of incoming data packets may be completed even in the presence of detected fault(s) within the apparatus 100. The one or more servers 106 may include single or multi-processing cores, in which in the case of multi-processing cores, each of the multi-processing cores may include or implement an instance of the module 110.

Each of the remaining nodes 112, 122, 132 may include similar components as in node 102. Nodes 112, 122, 132 may respectively include, without limitation, one or more receive NICs 114, 124, 134; one or more servers 116, 126, 136; and one or more transmit NICs 118, 128, 138. Likewise, the one or more servers 116, 126, 136 may respectively include fault detection and routing management modules 120, 130, 140. In some embodiments, nodes 102, 112, 122, 132 may include additional components such as, but not limited to, compute node interfaces, host fabric interfaces (HFIs), switches, firewalls, repeaters, and the like.

Each of the nodes 102, 112, 122, 132 may include and/or be associated with a plurality of input ports and a plurality of output ports. For a given node, its plurality of input ports may receive data packets to be routed and its plurality of output ports may transmit the data packets to the appropriate next "hop" (e.g., another node) within the apparatus 100 in accordance with destination information included in the incoming data packets and current fault status within the apparatus 100. Within the given node, the plurality of input ports may be associated with and/or coupled to ports of its receive NIC(s) and the plurality of output ports may be associated with and/or coupled to ports of its transmit NIC(s). In some embodiments, the one or more servers included in the given node may be in communication with the receive and transmit NIC(s), so that the one or more servers may analyze the incoming data packets for appropriate routing within the apparatus 100 (e.g., determining the particular pathway to a particular node within the apparatus 100), as described further below.

In some embodiments, apparatus 100 may be included in a data center, computing fabric, network, and the like, and may appear to the other components within the data center, computing fabric, network, and the like as a unitary network equipment (e.g., a router). The components within the apparatus 100, such as the links 150, 152, 154, 156, 158, 159 or that there are a plurality of nodes 102, 112, 122, 132, may be invisible to components outside of the apparatus 100. To the components external to the apparatus 100, the apparatus 100 may appear to have a plurality of input ports to receive data packets to be routed and a plurality of output ports to which the received data packets may be selectively transferred in order to be routed to destinations specified in the received data packets.

Within the apparatus 100, each of the received data packets may traverse a particular path from a particular one of the nodes 102, 112, 122, 132 in which the data packet may be first received/incoming to the apparatus 100 (such node denoted the ingress node) to a particular one of the nodes 102, 112, 122, 132 from which the data packet may exit the apparatus 100 (such node denoted the egress node). A plurality of possible paths may exist between an ingress node and an egress node. Within the interconnect fabric of apparatus 100, as may be seen in FIG. 1, multiple paths may be possible from any of nodes 102, 112, 122, 132 to any other node 102, 112, 122, 132—both "direct" paths and "bounce" or "indirect" paths. For instance, data packets received by node 102 (e.g., node 1, the ingress node) and intended to be provided to node 132 (e.g., node 4, the egress node) may take a "direct" path to node 132 via link 158 (node 1->node 4); a "bounce" or "indirect" path via link 150, node 112, and link 154 (node 1->node 2->node 4); or a "bounce" or "indirect" path via link 152, node 122, and link 156 (node 1->node 3->node 4). One or more of the modules 110, 120, 130, 140 may be configured to determine an optimal path for the given data packet taking into account parameters such as, but not limited to, current link traffic levels, link traffic level/load balance, node processing load balance, to minimize data packet reordering, routing rules, node failure, link failure, and/or the like.

Figure 2:
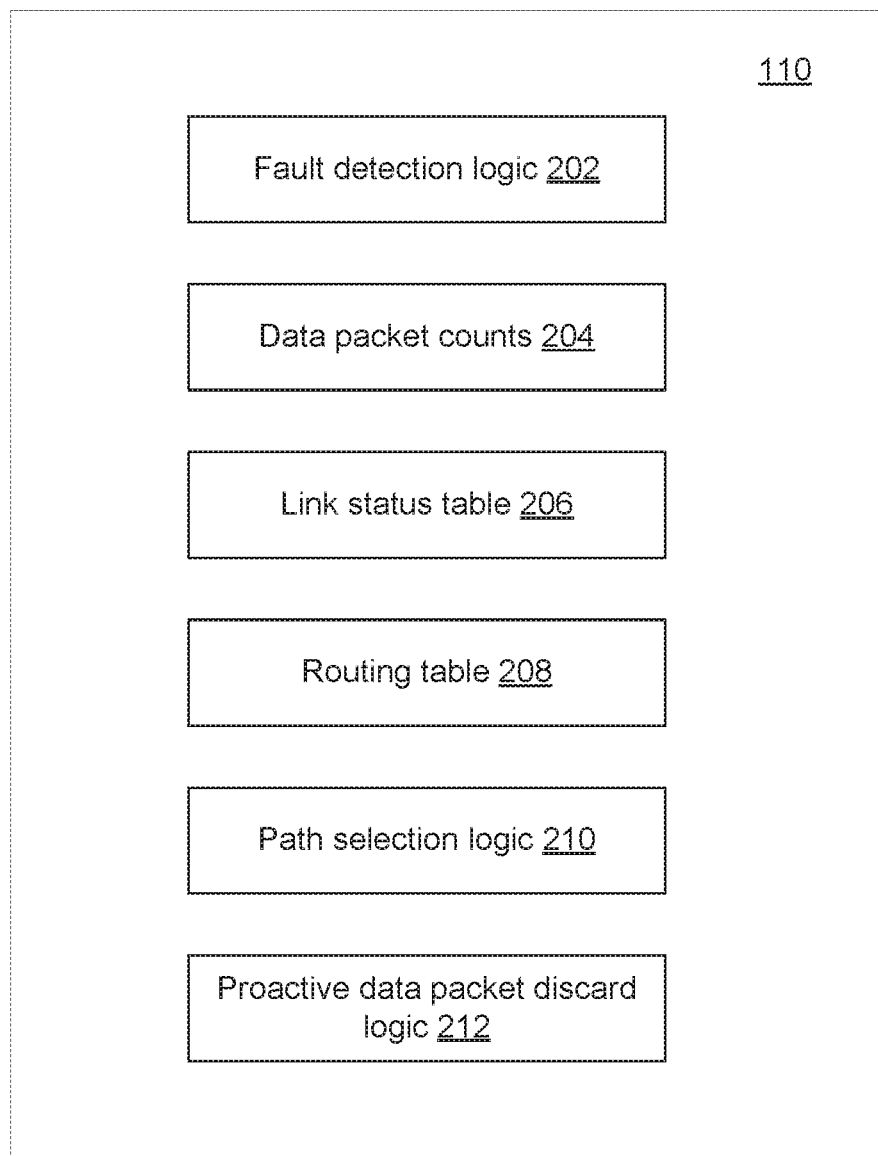
FIG. 2 depicts an example block diagram illustrating details of a fault detection and routing management module included in the apparatus of FIG. 1, according to some embodiments.

FIG. 2 depicts an example block diagram illustrating details of the fault detection and routing management module 110, according to some embodiments. In some embodiments of the present disclosure, module 110 may include, without limitation, fault detection logic 202, data packet counts 204, link status table 206, routing table 208, path selection logic 210, and proactive data packet discard logic 212.

Fault detection logic 202 may be configured to detect or determine the presence of a fault in node 102 based on certain characteristics of data packet counts 204 obtained from the receive and transmit NICs 104, 108. As described in detail below, the detection of a node fault may also be considered to be the presence of a fault in one or more of the input and output ports of the node 102. Since the input and output ports may be coupled or connected to particular links or interconnect fabric, particular links may, by extension, be deemed to be in a faulty operational state. The operational state or status of respective links (directly) coupled to node 102 may be maintained in the links status table 206.

In some embodiments, the path selection logic 210 may be configured to select or determine a particular path using at least one of links 150, 152, or 159 to another node of the apparatus 100, in which the selected path may be based on the destination IP address of the data packet received by the node 102, the external output port of an egress node identified for the destination IP address of the data packet in the routing table 208, avoidance of any links indicated as faulty in the link status table 206, and optionally, one or more other routing parameters (e.g., load balancing, randomization, etc.).

In cases where, for the received data packet at the node 102, the external output port identified for the data packet may be in a faulty state, the proactive data packet discard logic 212 may be configured to proactively and intentionally discard the data packet instead of selecting a path within the apparatus 100 and forwarding the data packet to another node of the apparatus 100. The proactive data packet discard logic 212 may be further configured to prevent propagation of false faulty detection among the nodes of the apparatus 100 caused by intentional/proactive discarding of data packets via use of a destination IP address filter list for the receive NIC 104, in some embodiments.

In some embodiments, one or more of the fault detection logic 202, path selection logic 210, and proactive data packet discard logic 212 may be implemented as software comprising one or more instructions to be executed by one or more processors included in the server 106 or within the node 102. In some embodiments, the one or more instructions may be stored and/or executed in a trusted execution environment (TEE) of the server 106 or node 102. Alternatively, one or more of the fault detection logic 202, path selection logic 210, and proactive data packet discard logic 212 may be implemented as firmware or hardware such as, but not limited to, an application specific integrated circuit (ASIC), programmable array logic (PAL), field programmable gate array (FPGA), circuitry, on-chip circuitry, on-chip memory, and the like.

Similar logic and data/tables may be included in each of the modules 120, 130, 140 for respective nodes 112, 122, 132, in which the link status table included in a given node may include status information of links "local" to the given node (e.g., links (directly) coupled to the input and output NIC ports of the given node). In some embodiments, the routing table may be the same (e.g., global) in more than one node of the apparatus 100. Alternatively, the routing table may be local or tailored to the particular node in which it may be maintained.

Figure 3:
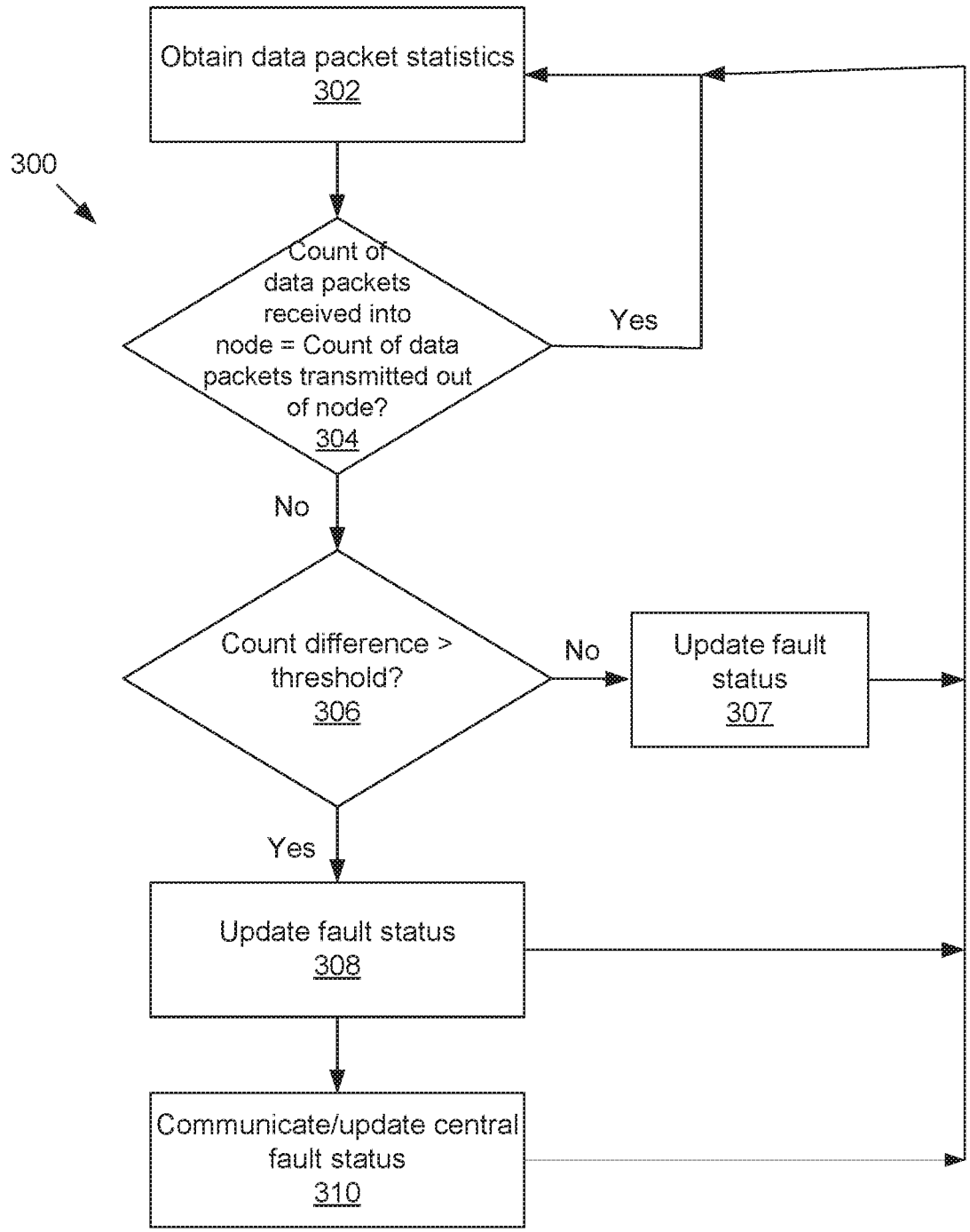
FIG. 3 depicts an example process to detect one or more fault associated with one or more node and/or link included in the apparatus of FIG. 1, according to some embodiments.

FIG. 3 depicts an example process 300 to detect one or more fault associated with one or more node and/or link included in the apparatus 100, according to some embodiments. In some embodiments of the present disclosure, each node of nodes 102, 112, 122, 132 may be configured to perform process 300 on a periodic, continuous, on-demand, random, and/or other time basis. Each of the nodes 102, 112, 122, 132 may perform process 300 independently of each other.

A scalable cluster of interconnected compute nodes may operate together to perform network packet routing functions, such as the apparatus 100. In such a design, a node may receive data packets from one or more external ports (e.g., analogous to line cards in conventional hardware routers) and dispatch the data packets through a network interconnect fabric (e.g., one or more of links 150-159) to other node(s) within the cluster for forwarding the data packets to respective destinations. As data packets arrive at an ingress node, such data packets may be received by one or more receive NICs associated with the ingress node. For each of the data packets, the one or more servers included in the ingress node may obtain the data packets from the receive NIC(s), examine header information associated with the data packets (e.g., for destination information), perform routing table lookup, and determine appropriate path selection to an appropriate egress node for each data packet.

Within apparatus 100, one or more faults may occur which may affect the ability to route data packets. For instance, link failure, node failure, software fault, hardware fault, and/or other faults may be possible. When such fault(s) occur, the ability to adapt automatically by detecting the fault(s) and bypassing such fault(s) while still getting data packets to their destinations may be advantageous. In some embodiments, faulty links and nodes may be isolated (e.g., by avoiding paths within the apparatus 100 that include such faulty links and nodes) while remaining paths associated with functional components within the apparatus 100 may continue to be employed. Accordingly, a "graceful" degradation of performance of the apparatus 100 may be provided, in which the apparatus 100 may provide a level of fault resilience and improved reliability, even under less than ideal operating conditions.

In some embodiments, any single node within the apparatus 100 may not have full/all information about the apparatus 100; instead, a single node may only know about the data packets it directly receives and then transmits out to the "next hop" within the apparatus 100. Moreover, when routing paths within the apparatus 100 may include randomization (e.g., to facilitate load balancing), it may be difficult to monitor specific end-to-end points of the apparatus 100 as they may not be known for a given data packet. In some embodiments, as described below, process 300 may be configured for a given node to detect fault(s) without the need for global or full information about the apparatus 100, even if data packets traversing within the apparatus 100 may comprise random paths, and/or if the fault(s) may comprise a node failure, link failure, node or link software failure, and/or node or link hardware failure.

For purposes of illustration, process 300 is described below in the context of node 102. However, as mentioned above, process 300 may be performed by each/any of nodes 102, 112, 122, and 132. At a block 302, the fault detection logic 202 included in the server 106 may be configured to obtain one or more statistics associated with data packets received by the node 102. In some embodiments, fault detection logic 202 included in the server 106 may be configured to (periodically) poll statistics counters included in receive and transmit NICs 104, 108, in order to obtain data packet statistics 204 obtained and maintained therein. The data packet statistics 204 may include counts of various types of data packets received into or transmitted out of the node 102. For example, without limitation, data packet statistics 204 (also referred to as data packet counts) may comprise a count of input data packet traffic into the node 102 (and more particularly, a number of error-free data packets with valid cyclic redundancy checks (CRCs) received and copied by receive NIC 104 to a (host) memory) and a count of output data packet traffic out of the node 102 (and more particularly, a number of error-free data packets with valid CRCs copied to the transmit NIC 108 from the (host) memory). The count of input data packet traffic may be provided by receive counters included in the receive NIC 104 and the count of output data packet traffic may be provided by transmit counters included in the transmit NIC 108.

Next, at a block 304, the fault detection logic 202 included in the server 106 may be configured to determine whether the count of input data packet traffic equals the count of output data packet traffic for node 102. The concept of "conservation of flow" may be used to facilitate detection a faulty node and/or links (e.g., node 102, link 150, link 152, and/or link 158) without requiring global information and irrespective of potential random paths that data packets received at node 102 may have taken within the apparatus 100.

Figure 4:
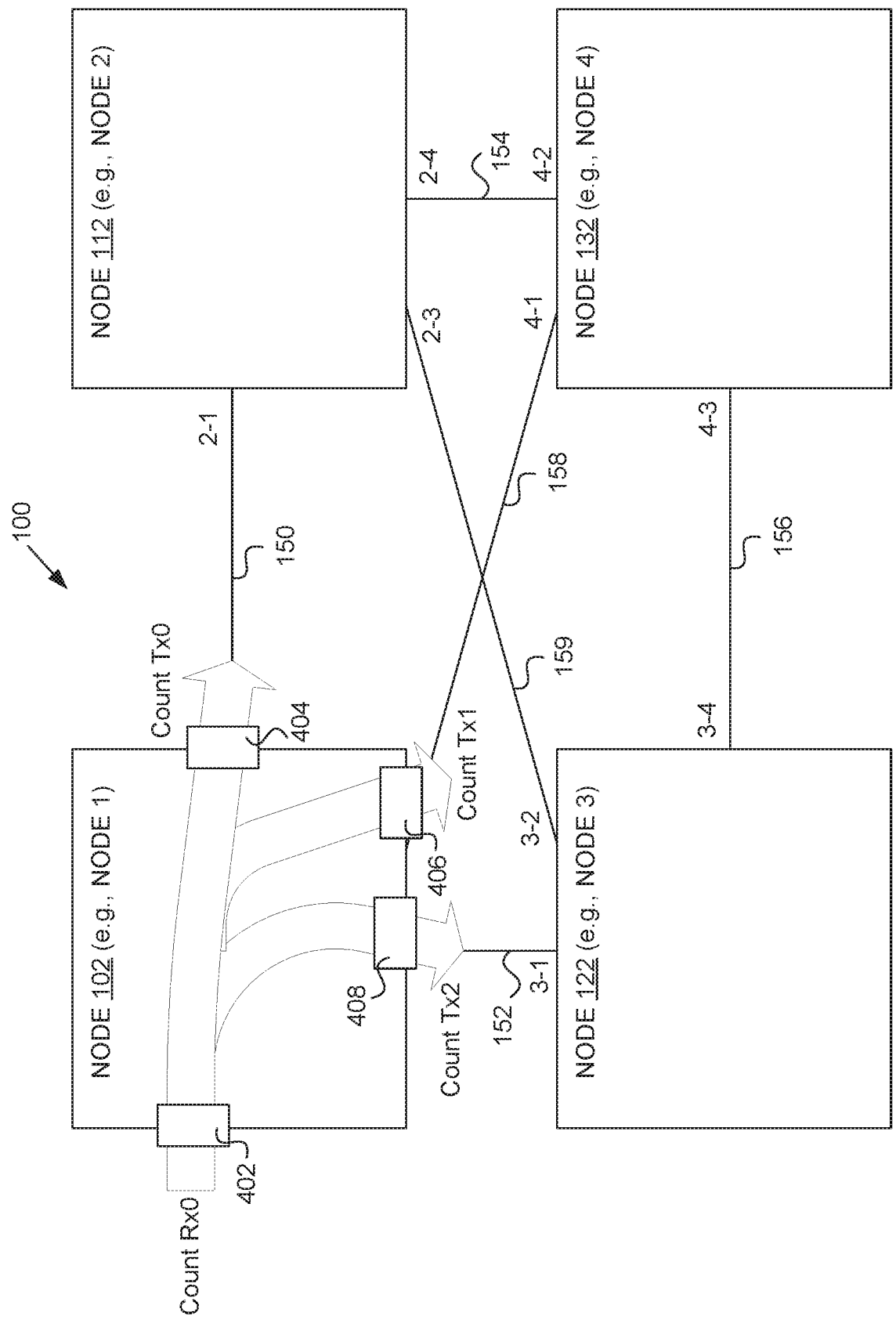
FIG. 4 depicts an example illustration of the "conservation of flow" concept, in accordance with some embodiments.

FIG. 4 depicts an example illustration of the "conservation of flow" concept, in accordance with some embodiments. Each node included in the apparatus 100 may include one or more input ports and one or more output ports. Data packets may arrive at the input port of a given node to be switched to particular output port(s) of the given node based on a destination IP address, routing logic, and other parameters associated with path selection through the apparatus 100. An input or output port that may be located or "face" outward of the apparatus 100 may be deemed to be an external port. Conversely, an input or output port that may be located or "face" inward of the apparatus 100 may be deemed to be an internal port. FIG. 4 shows node 102 including an input port 402 that comprises an external (input) port and three output ports 404, 406, 408 that comprise internal (output) ports.

Ideally, a router may comprise a network device whose job is to switch data packets from input ports to appropriate output ports. The amount of error-free data packet traffic that may arrive at a router should be the same amount of error-free data packet traffic leaving the router, with no injection of new data packets or dropping of significant portions of the input traffic. Thus, a "conservation of flow" of input data packet traffic may be deemed to occur. Not only may such "conservation of flow" be similarly applicable to apparatus 100 overall, which may be configured to function as a router, each node included in the apparatus 100 may, under normal or ideal conditions, also observe such traffic flow conservation. For example, a count of the input data packet traffic Rx0 for node 102 equals the sum of a count of output data packet traffic Tx0, output data packet traffic Tx1, and output data packet traffic Tx2, as shown in FIG. 4.

Accordingly, when the values of the input and output counts diverge (by a certain amount), such divergence may indicate one or more software and/or hardware faults associated with the node 102, link 150, link 152, and/or link 158 causing data packets to be dropped, lost, or otherwise improper handling and/or erroneous change to data packet content such that they may no longer have valid CRCs. In some embodiments, the fault detection logic 202 included in the server 106 may be configured to compare the count/number of error-free data packets with valid CRCs received and copied by receive NIC 104 to a (host) memory to the count/number of error-free data packets with valid CRCs copied to the transmit NIC 108 from the (host) memory, at block 304.

When the counts may be equal to each other (yes branch of block 304), then process 300 may return to block 302 to obtain data packet statistics for the next time period. This permits detection of faults in real-time or near real-time so that timely routing actions may be taken on future data packets to avoid faulty portion(s) of the apparatus 100. When the counts may not be equal to each other (no branch of block 304), then process 300 may proceed to block 306.

At block 306, the fault detection logic 202 included in the server 106 may be configured to determine whether the difference between the input and output traffic counts (obtained in block 302) exceeds a pre-defined threshold. When a large enough difference, divergence, or deviation exists between the input and output traffic counts, the cause of such a large difference may be due to fault(s) in the node 102 and/or port(s) associated with the node 102 (e.g., input port 402, output port 404, output port 406, output port 408). In some embodiments, the pre-defined threshold may be 95%, 97%, 98%, or some other value that takes into account potential differences that may occur between the input and output traffic counts even when no fault may exist in the node 102 and its input and output ports under normal or ideal operation of the node 102. For example, some data packet loss may be expected due to bad checksums, data packet time-to-live timer expiration, and the like.

When the difference may above the pre-defined threshold (yes branch of block 306), then a fault may be deemed to have been detected. In response, the fault detection logic 202 included in the server 106 may be configured to update, mark, flag, or otherwise indicate the detection/presence of a fault associated with node 102, at a block 308. In some embodiments, when a single node (e.g., node 102) may be determined to be faulty, all of the node's input and output ports (e.g., input port 402 and output ports 404, 406,408) may also be treated as being faulty. The links (directly) connected to the node may serve as proxies for respective input and output ports of the node. Thus, when the difference exceeds the threshold in block 306, the fault detection logic 202 included in the server 106 may be configured to denote as faulty node 102 as well as the external link into node 102 (associated with input port 402) and internal links 150, 158, 152 (associated with respective output ports 404, 406, 408). Node 102 and its collection of links may be deemed to be faulty so that they may all be avoided and data packet traffic may be routed away from such assumed faulty paths.

Upon completion of updating the fault status in block 308, process 300 may continue to blocks 302 and 310. At block 310, the fault detection logic 202 included in the server 106 may be configured to facilitate communication or dissemination of the detected fault to other component(s). In some embodiments, the detected fault notification may be performed using an interface in the control plane, which may be used to communicate and broadcast information among the nodes of the apparatus 100, and/or to a central network controller, which in turn may update the other nodes as to the status of each node and link of the apparatus 100. From block 310, process 300 may return to block 302 to continue monitoring for faults. In alternative embodiments, block 310 may be optional.

When the difference may be below the pre-defined threshold (no branch of block 306), process 300 may proceed to block 307 to update the fault status of node 102 and its collection of links may be deemed to be functional and available for use in routing data packets. Then process may return to block 302 to continue monitoring for possible faults or change in operational status.

In alternative embodiments, fault detection logic 202 included in the server 106 may be configured to detect faults on a per link basis for a given node—one or more particular links from among the links connected to node 102. In block 302, for example, the obtained data packet statistics may comprise traffic counts associated with each port (which in turn may be associated with a particular link) of the node 102. The traffic counts associated with the input port(s) may also include additional information such as how much of the traffic was switched to which output port, for example.

With the traffic counts (e.g., counts of error-free data packets with valid CRCs) available on a per port/link basis, the fault detection logic 202 may perform blocks 304-310 for each set of traffic counts associated with a particular pair of input and output ports. For example, a first set of traffic counts may be associated with input port 402 and output port 404, a second set of traffic counts may be associated with input port 402 and output port 406, and a third set of traffic counts may be associated with input port 402 and output port 408. Hence, if the traffic count difference between a particular input port and a particular output port of the node 102 exceeds a threshold (block 306), then a fault may be deemed to have been detected in the particular input port and particular output port, and more particular, the particular links associated with those particular input and output ports.

In this manner, each node of the apparatus 100 may detect local faults using only local information (e.g., from counters included in receive and transmit NICs) and independent of each other, and without the need for global information, information about another node, a centralizer controller, or data plane status information being exchanged among the nodes of the apparatus 100.

In some embodiments, the fault status of at least the internal links (directly) connected to node 102 may be maintained in a link status table 206 included in the server 106, at block 308. A link status change may invoke a fault isolation application program interface (API) in the node 102 to update/mark the link of interest as up (e.g., functional) or down (e.g., faulty and to be avoided) in the link status table 206. One or more link status tables may be maintained for a given node of the apparatus 100. Links 150-159 are internal to the apparatus 100 (and not visible to components outside of the apparatus 100). In some embodiments, when a fault isolation API may be invoked to update/mark a link as down, both ends of the link may be deemed to be down. For instance, if link 150 may be determined to be down by node 102, not only may end 1-2 of link 150 be deemed to be faulty, but the other end 2-1 of link 150 may also be deemed to be faulty. Thus, a link status table maintained at node 112 (the node to which end 2-1 may be connected) may include an indication of link 150 and/or end 2-1 of link 150 as down.

In some embodiments, the ports connected to an end 1-2 or 2-1 of link 150, components coupled to end 1-2 or 2-1 (e.g., couplers or connectors that may connect a port to an end of the link 150), end 1-2 or 2-1, and/or other components may be configured to periodically "ping" or otherwise communicate with the other end of link 150. For example, if an acknowledge response is not returned in response to a "ping" from end 2-1 to end 1-2, because end 1-2 may be faulty in the example above, then the status of end 2-1 may now be updated. And its associated node 112 may accordingly update its link status table to indicate link 150 and/or end 2-1 as being down.

Figure 5A:
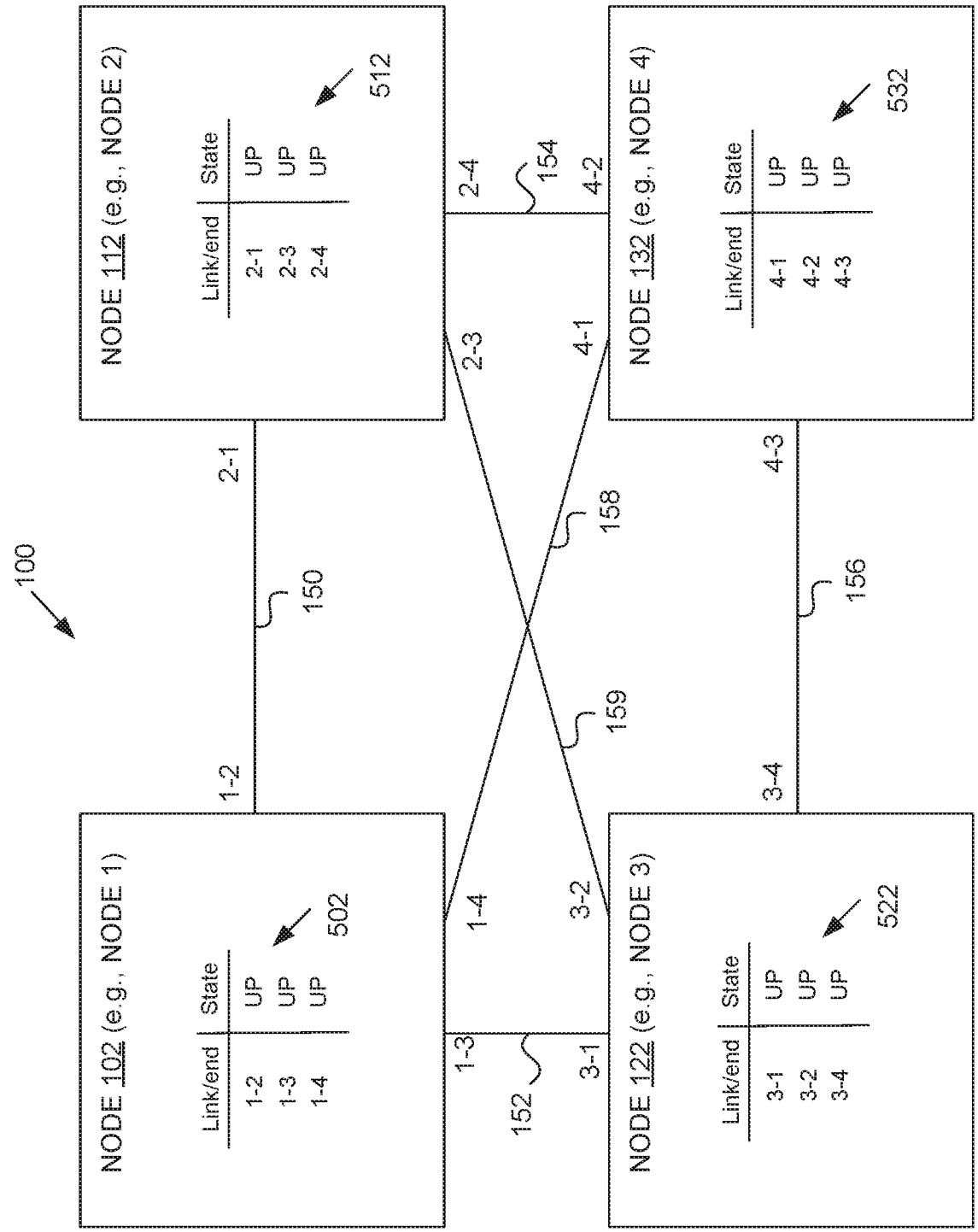
FIG. 5A depicts example link status tables for respective nodes of the apparatus of FIG. 1 when the apparatus may be in a full operational mode (e.g., no node or link faults detected), according to some embodiments.

FIG. 5A depicts example link status tables for respective nodes of the apparatus 100 when the apparatus 100 may be in a full operational mode (e.g., no node or link faults detected), according to some embodiments. A link status table 502 (also referred to as link status information, fault status information, link fault status information, or the like) may be included in the node 102. Link status table 502 includes in indication of the fault or functional status/state of each link 150, 152, 158 (directly) coupled to node 102. In some embodiments, an identifier of the particular ends of the respective links most proximate to node 102 may be provided in the table 502. With no fault detected at node 102, all of the associated links may be in a functional or up state. Link status tables 512, 522, and 532 specific to each of the remaining nodes of apparatus 100 may be similarly maintained in respective nodes 112, 122, and 132.

Figure 5B:
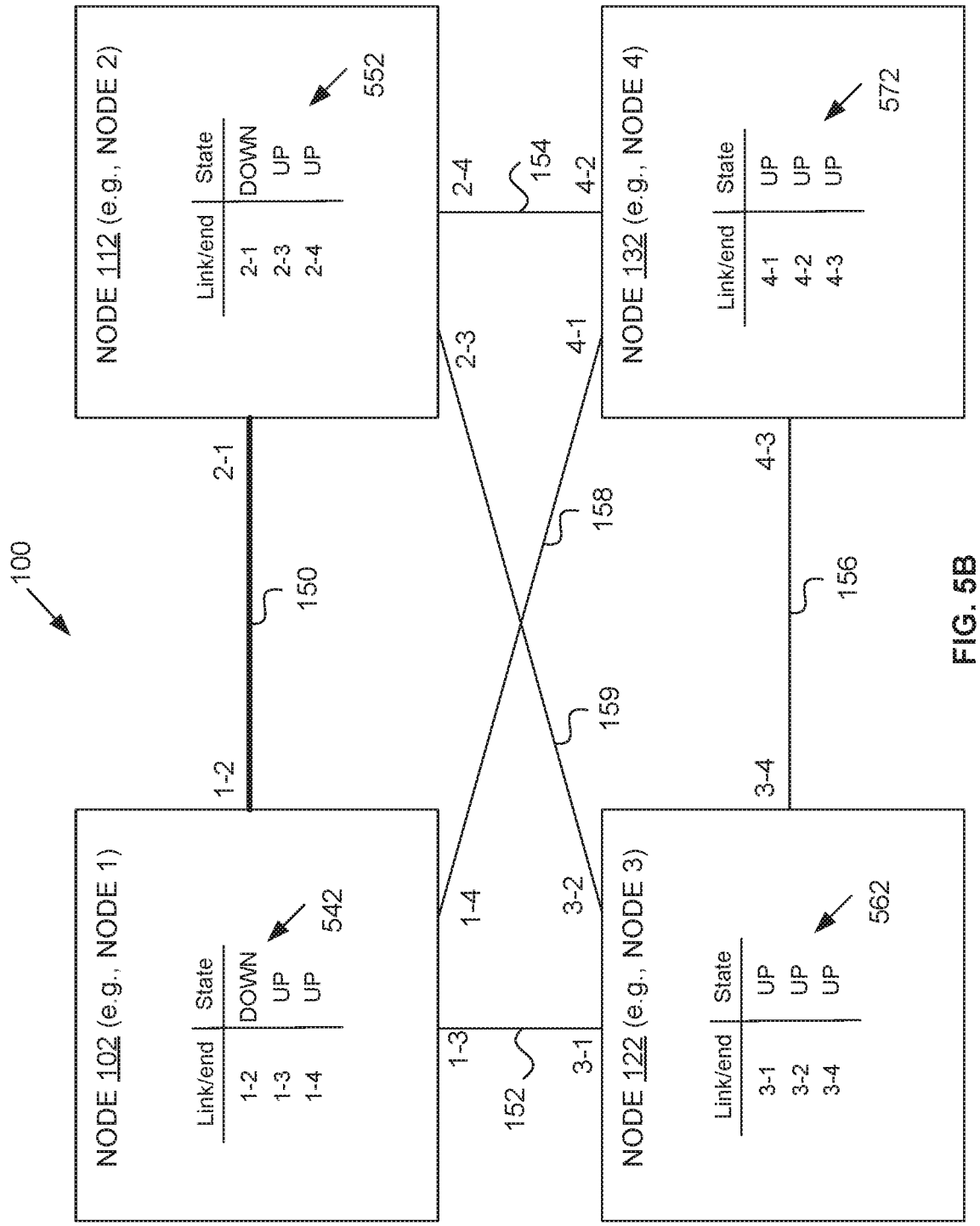
FIG. 5B depicts example link status tables for respective nodes of the apparatus of FIG. 1 when the apparatus may be in a failure, fault, or degraded operational mode (e.g., at least one node or link fault detected), according to some embodiments.

In contrast, FIG. 5B depicts example link status tables for respective nodes of the apparatus 100 when the apparatus 100 may be in a failure, fault, or degraded operational mode (e.g., at least one node or link fault detected), according to some embodiments. In FIG. 5B, one or both of nodes 102 and 112 may have determined the presence of a fault with respect to link 150. For example, one or both of ends 1-2 and 2-1 of link 150 may have been determined to be faulty. Thus, link status table 542 associated with node 102 may include an indication that end 1-2 or link 150 is faulty or down, and link status table 552 associated with node 112 may include an indication that end 2-1 or link 150 is faulty or down. As described in detail below, such status indication permits determination/selection of data packet traversal paths within the apparatus 100 that excludes those paths including link 150.

Although not shown in the link status tables illustrated in FIGS. 5A-5B, it is understood that such tables may also include the operational status/state of one or more external input ports/links and external output ports/links (directly) coupled to respective nodes of apparatus 100.

Figure 6:
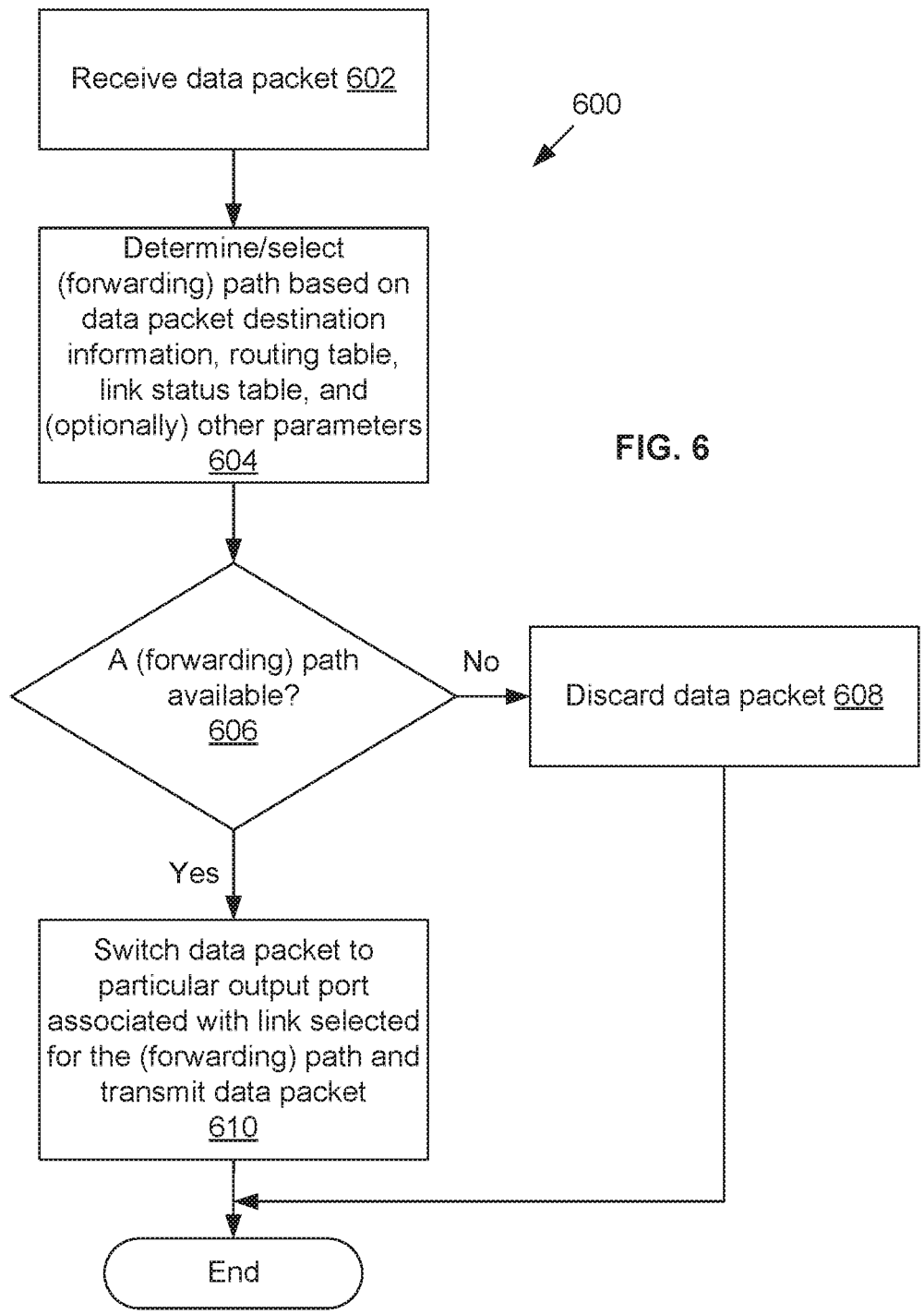
FIG. 6 depicts an example process for a node included in the apparatus of FIG. 1 to select a path to forward a received data packet to another node included in the apparatus as part of routing the data packet to its intended destination, according to some embodiments.

FIG. 6 depicts an example process 600 for a node included in the apparatus 100 to select a path to forward a received data packet to another node included in the apparatus 100 as part of routing the data packet to its intended destination, according to some embodiments. For purposes of illustration and in continuance of the description above, it is assumed that node 102 may perform process 600 in response to receiving a data packet to be routed through the apparatus 100. It is understood that process 600 may be performed on a per data packet granularity by any of the nodes 102, 112, 122, 132; may be performed independently among the nodes 102, 112, 122, 132; and may be performed as needed by a given node, as discussed in detail below.

At a block 602, a data packet may arrive at an input port of node 102. For example, the data packet may arrive at input port 402 and be received by the receive NIC 104. In response to receiving the data packet, the path selection logic 210 included in the server 106 may be configured to determine or select a path within the apparatus 100 to which the data packet is to at least partially traverse, at a block 604. Because the data packet is to be forwarded to another node included in the apparatus 100 from node 102, the selected path may also be referred to as a forwarding path. In some embodiments, the path to be selected may comprise selection of a particular link and a particular node within the apparatus 100 to which the data packet is to be forwarded. The particular link may further comprise a particular single link (directly) coupled or connected to node 102 (e.g., selecting one of links 150, 152, or 158), and thus considered to be a single "hop." In alternative embodiments, the particular link may comprise more than one link, in which at least one of the links may comprise a link (directly) coupled or connected to node 102 (e.g., selecting one of links 150, 152, or 158 and possibly one or more of links 154, 159, or 156). Such a path may be considered to be a compound "hop" as is the case with an indirect or bounce path.

In some embodiments, the path selection logic 210 included in the server 106 may be configured to determine/select a path based on the destination IP address associated with the data packet, the routing table 208, the link status table 206, and optionally, one or more other parameters. The path selection logic 210 may be configured to access the routing table 208 to perform a lookup using the destination IP address. The routing table 208 may specify a particular egress node (or a particular egress output port of a particular egress node) for the destination IP address. Such egress node/output port information may define the final destination for the data packet within the apparatus 100. The path selection logic 210 may also be configured to access the link status table 206 in order to check for the (current) operational status of links so as to determine which link(s) may be available for forwarding the data packet. For example, if the link status table 206 comprises the link status table 502 in FIG. 5A, in which links 150, 152, and 158 may be indicated as "up," then links 150, 152, and 158 may all be available as viable links for path selection. As another example, if the link status table 206 comprises the link status table 542 in FIG. 5B, in which link 150 may be indicated as "down," then link 150 may be avoided or removed from consideration as a viable link for path selection. Only links 152 and 158 may be considered available for forwarding the data packet.

In some embodiments, the path selection logic 210 may also take into account one or more parameters such as, but not limited to, load balancing, randomization, and/or other routing considerations in the selection of a path. While a variety of parameters may be considered in selecting a path (via a single hop or compound hops) to a particular egress node, the path selection logic 210 may avoid selecting a path which requires use of any link indicated to be down, faulty, or otherwise not available for use.

When there is no path available that avoids a link detected to be faulty (no branch of block 606), then the data packet may be discarded or dropped and not switched to any output port of node 102, at a block 608. Routing of the data packet may not be possible in such a case. When a path may be available that does not include a link detected to be faulty (yes branch of block 606), then the data packet may be switched to the particular output port of node 102 associated with the selected path for transmission of the data packet to another node included in the apparatus 100, at a block 610.

The node that receives the data packet transmitted from node 102 in accordance with the selected path (e.g., node 112, node 122, or node 132) may then perform process 600 to, in turn, continue routing the data packet through the apparatus 100 for delivery to the destination specified in the data packet. Because each node included in the apparatus 100 has its own local link status table which provides operational state information about changing conditions within the interconnect fabric most proximate to it (e.g., the links coupled or connected to the node), the recipient node may ensure that at least the next "hop" may occur using a viable/functioning portion of the interconnect fabric. In this manner, apparatus 100 may be configured to dynamically adapt to changing conditions within the interconnect fabric while allowing continued routing operations during link fault time periods that may otherwise cause a complete failure of some routes through the apparatus 100.

In some embodiments, when an external output port of an egress node of the apparatus 100 is determined to be faulty (such as using process 300), in which the external output port may be designated in a routing table as corresponding to a particular destination address associated with data packets, rather than route data packets destined for such external output port through the apparatus 100 only to arrive at the egress node and then be discarded (in accordance with process 600), such data packets may be proactively discarded. Such data packets may be discarded by the first node of the apparatus 100 that receives the data packets from outside the apparatus 100.

Figure 7:
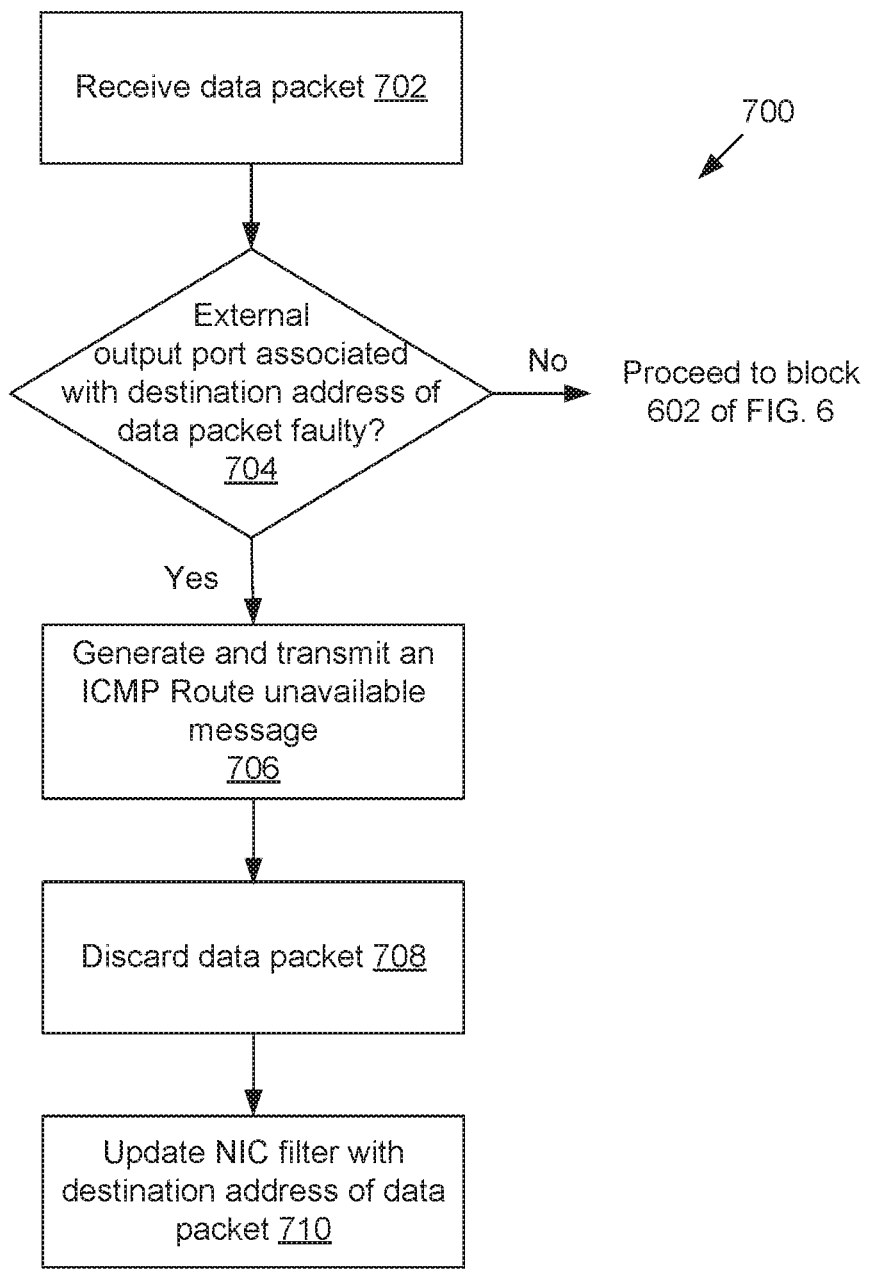
FIG. 7 depicts an example process for a node of the apparatus of FIG. 1 to proactively discard a data packet destined for a faulty external output port of an egress node associated with the data packet, according to some embodiments.

FIG. 7 depicts an example process 700 for a node of the apparatus 100 (e.g., the first data packet receiving node within the apparatus 100 for a given data packet) to proactively discard a data packet destined for a faulty external output port of an egress node associated with the data packet, according to some embodiments.

At a block 702, a node of the apparatus 100 may receive a data packet. Block 702 may be similar to block 602 of FIG. 6. In some embodiments, the receiving node may comprise the first node within the apparatus 100 that receives the data packet from outside the apparatus 100. In other words, the receiving node may comprise the ingress node for the data packet. In alternative embodiments, the receiving node may comprise any node that receives the data packet other than the egress node for the data packet. For purposes of illustration and to continue the example above, it is assumed that the ingress node for the received data packet comprises node 102.

Next at a block 704, the proactive data packet discard logic 212 included in the server 106 of node 102 may be configured to access information maintained in the routing table 208 to perform a lookup using the destination IP address associated with the data packet. The routing table 208, in some embodiments, may identify, among other things, the egress port (also referred to as the external output port) and egress port status associated with respective destination addresses. The egress port status may be obtained via the fault status communication or sharing discussed above in the context of block 310 of FIG. 3, in some embodiments. An example of some embodiments of the routing table 208 may be as shown below.

| Address | Egress port | Egress port status |
|---|---|---|
| 192.168.1.0/24 | Ext1 | UP |
| 192.168.2.0/24 | Ext2 | UP |
| 192.168.3.0/24 | Ext3 | DOWN |
| 192.168.4.0/24 | Ext4 | UP |

Using the destination IP address associated with the data packet, the proactive data packet discard logic 212 may perform a lookup on the routing table 208 to identify the current operational status of the egress port associated with the destination IP address. When the egress port status may be indicated as "up" or otherwise functional (no branch of block 704), then process 700 may proceed to block 602 of FIG. 6 to perform path selection. Conversely, when the egress port status may be indicated as "down" or otherwise in a faulty state (yes branch of block 704), then process 700 may proceed to block 706. As an example, if the destination IP address of the data packet comprises 192.168.3.10, the above table shows that Ext3, the associated egress port for this destination IP address, is "down." Accordingly, the handling of this data packet may proceed to block 706.

At block 706, the proactive data packet discard logic 212 may be configured to generate and transmit an error message to the sender of the data packet, such as a component coupled to the particular external input port of node 102 from which the data packet was transmitted for routing to the specified destination IP address. In some embodiments, the error message may comprise an Internet control message protocol (ICMP) "Route unavailable" message. Providing the error message to the sender may improve the probability that the sender may refrain from future transmissions of other data packets to the same destination address.

Next at a block 708, the proactive data packet discard logic 212 may facilitate discard of the data packet and no further transmission or routing of the data packet may occur.

With the intentional and proactive discarding of data packets, if the number of such discarded data packets may be high enough for a given node, such discarding may materially contribute to a data packet count disparity or difference between the input and output data packet traffic for the given node sufficient to trigger a false fault detection. Recall that in process 300, when the difference between the input and output data packet traffic for a given node exceeds a threshold, the node and by extension, one or more of the node's ports (or links coupled to the ports) may be deemed to be faulty.

Not only may a false fault detection of a node occur, but the associated avoidance or isolation of such node may further cause one or more or all of the remaining nodes of the apparatus 100 to also be falsely categorized as faulty. Thus, data packet count disparity caused by intentional/proactive data packet discard in the presence of fault detection in a first node of the apparatus 100 may have a domino effect in improperly detecting faults in one or more or all of the remaining nodes of the apparatus 100 as well. In an extreme case, all nodes of the apparatus 100 may be isolated, thereby causing complete failure of the apparatus 100 as a router. As an example, assume that node 132 of apparatus 100 (or at least the egress port of node 132) is deemed to be faulty at a first time period. The fault detection may be due to an actual fault or due to intentional/proactive data packet discards. Accordingly, node 132 may be isolated or avoided by the remaining nodes of apparatus 100 for routing or path selection purposes. When node 112 notices that node 132 (or at least the egress port of node 132) may be considered to be isolated, data packets received at node 112 to be routed to the faulty egress port of node 132 may be intentionally/proactively discarded. If enough data packets may be discarded by node 112, a data packet count disparity may arise for node 112, sufficient to trigger a fault detection associated with node 112, at a second time period. Now, node 112 may also be isolated or avoided by the remaining nodes of apparatus 100 for routing or path selection purposes. This progression or domino effect of node isolation may continue with the remaining functional nodes (nodes 102 and 122) as each of the remaining functional nodes receive data packets intended to be routed to now an isolated/faulty node.

In some embodiments, in order to prevent occurrence of such domino effect, filters, such as hardware or software filters, included in receive NICs may be updated with the destination IP address associated with the discarded data packet, at block 710. The proactive data packet discard logic 212 may be configured to add the destination IP address to a filter list accessed by the receive NICs (such as receive NIC 104 for node 102). With the inclusion of the destination IP address to the filter list, data packets incoming to the node 102 may be checked against the filter list. Any incoming data packet having a destination IP address included in the filter list may be discarded by the receive NIC 104 and data packet counters associated with counting the input data packet traffic may be prevented from incrementing for incoming data packets that have been discarded due to the filter list. The filter list may also be referred to as a filter out list. Accordingly, the possibility of data packet count disparity sufficient to trigger false fault detection and subsequent domino effect may be prevented.

Figure 8:
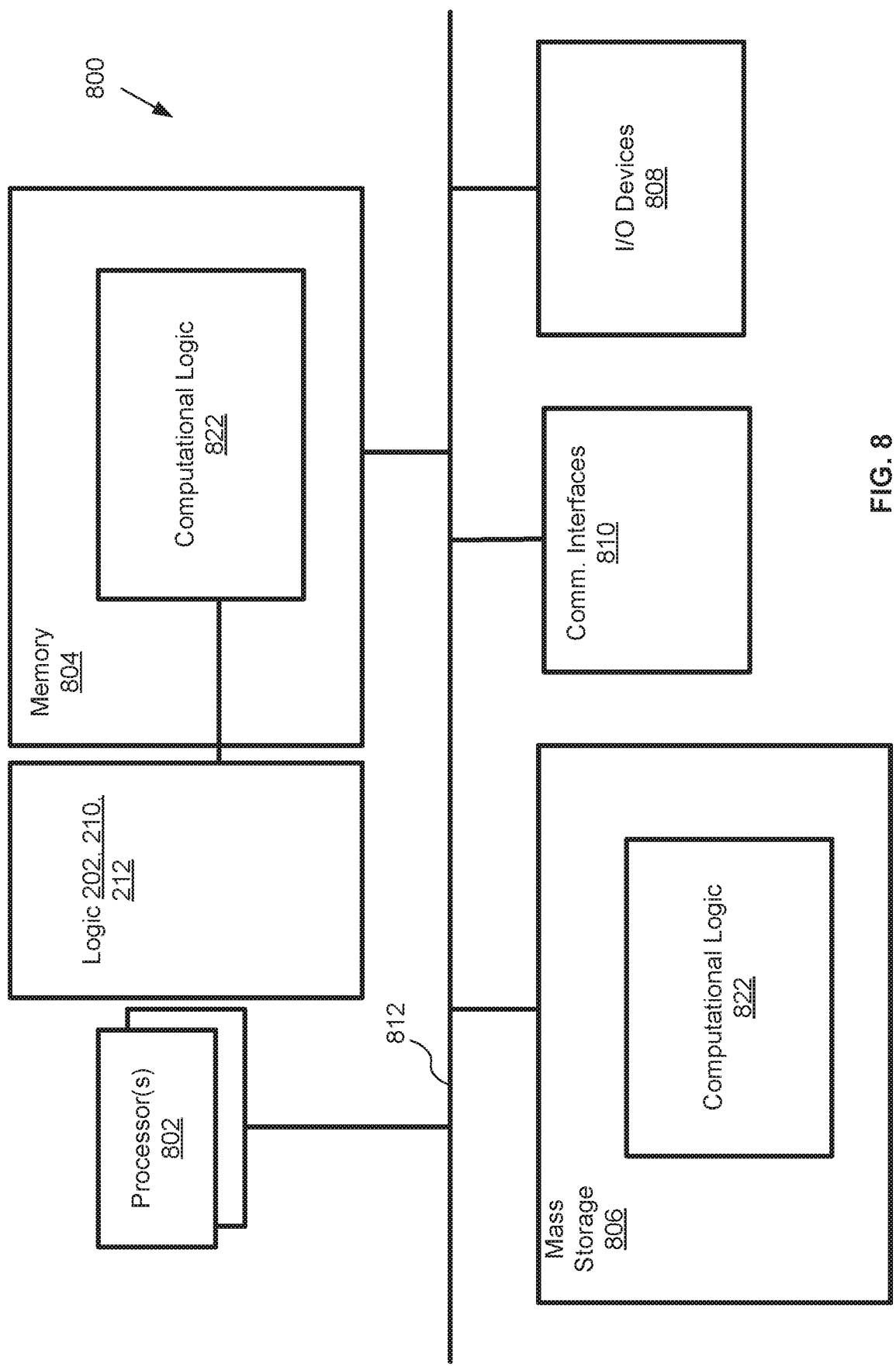
FIG. 8 illustrates an example computer device suitable for use to practice aspects of the present disclosure, according to some embodiments.

FIG. 8 illustrates an example computer device 800 suitable for use to practice aspects of the present disclosure, in accordance with various embodiments. In some embodiments, computer device 800 may comprise at least a portion of any of the node 102, 112, 122, and/or 132. As shown, computer device 800 may include one or more processors 802, and system memory 804. The processor 802 may include any type of processors. The processor 802 may be implemented as an integrated circuit having a single core or multi-cores, e.g., a multi-core microprocessor. The computer device 800 may include mass storage devices 806 (such as diskette, hard drive, volatile memory (e.g., DRAM), compact disc read only memory (CD-ROM), digital versatile disk (DVD), flash memory, solid state memory, and so forth). In general, system memory 804 and/or mass storage devices 806 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computer device 800 may further include input/output (I/O) devices 808 such as a microphone, sensors, display, keyboard, cursor control, remote control, gaming controller, image capture device, and so forth and communication interfaces 810 (such as network interface cards, modems, infrared receivers, radio receivers (e.g., Bluetooth)), antennas, and so forth.

The communication interfaces 810 may include communication chips (not shown) that may be configured to operate the device 800 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 810 may operate in accordance with other wireless protocols in other embodiments.

The above-described computer device 800 elements may be coupled to each other via a system bus 812, which may represent one or more buses. In the case of multiple buses, they may be bridged by one or more bus bridges (not shown). Each of these elements may perform its conventional functions known in the art. In particular, system memory 804 and mass storage devices 806 may be employed to store a working copy and a permanent copy of the programming instructions to support the operations associated with apparatus 100, e.g., in support of operations associated with one or more of logic 202, 210, or 212, generally shown as computational logic 822. Computational logic 822 may be implemented by assembler instructions supported by processor(s) 802 or high-level languages that may be compiled into such instructions. The permanent copy of the programming instructions may be placed into mass storage devices 806 in the factory, or in the field, through, for example, a distribution medium (not shown), such as a compact disc (CD), or through communication interfaces 810 (from a distribution server (not shown)). In some embodiments, aspects of computational logic 822 may be implemented in a hardware accelerator (e.g., Field Programmable Gate Arrays (FPGA)) integrated with, e.g., processor 802, to accompany the central processing units (CPU) of processor 802.

FIG. 9 illustrates an example non-transitory computer-readable storage media 902 having instructions configured to practice all or selected ones of the operations associated with the processes described above. As illustrated, non-transitory computer-readable storage medium 902 may include a number of programming instructions 904 configured to implement one or more of logic 202, 210, and/or 212, or computational logic 822, or bit streams 904 to configure the hardware accelerators to implement one or more of logic 202, 210, and/or 212 or computational logic 822. Programming instructions 904 may be configured to enable a device, e.g., computer device 800 (or server 106, 116, 126, and/or 136), in response to execution of the programming instructions, to perform (or in support of performance of) one or more operations of the processes described in reference to FIGS. 1-7. In alternate embodiments, programming instructions/bit streams 904 may be disposed on multiple non-transitory computer-readable storage media 902 instead. In still other embodiments, programming instructions/bit streams 904 may be encoded in transitory computer-readable signals.

Referring again to FIG. 8, the number, capability, and/or capacity of the elements 808, 810, 812 may vary, depending on whether computer device 800 may be used as a compute node, a storage node, a I/O node, a switch, a gateway, a router, or the number of processes computer device 800 is to support. Their constitutions are otherwise known, and accordingly will not be further described.

At least one of processors 802 may be packaged together with memory respectively having computational logic 822 or logic 202, 210, and/or 212 (or portion thereof) configured to support practice or practice aspects of embodiments described in reference to FIGS. 1-7. In some embodiments, at least one of the processors 802 may be packaged together with memory having respectively computational logic 822 or logic 202, 210, and/or 212 or aspects thereof configured to support the practice or practice aspects of processes 300, 600, 700 to form a System in Package (SiP) or a System on Chip (SoC).

In various implementations, the computer device 800 may comprise a desktop computer, a server, a router, a switch, or a gateway. In further implementations, the computer device 800 may be any other electronic device that processes data.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein.

Examples of the devices, systems, and/or methods of various embodiments are provided below. An embodiment of the devices, systems, and/or methods may include any one or more, and any combination of, the examples described below.

Example 1 is a compute node for cluster computing including one or more input ports to receive data packets from first selected ones of a cluster of compute nodes; one or more output ports to route data packets to second selected ones of the cluster of computer nodes; and one or more processors, wherein the one or more processors includes logic to determine a particular output port, of the one or more output ports, to which a data packet received at the one or more input ports is to be routed based on destination information associated with the data packet, an egress compute node of the cluster being associated with the destination information, and fault status information being associated with links communicatively coupled between respective output port of the one or more output ports and respective compute node of remaining compute nodes of the cluster, and wherein the logic is to exclude output ports associated with links indicated in the fault status information as having a fault status to be the particular output port to which the data packet is to be routed.

Example 2 may include the subject matter of Example 1, and may further include wherein the fault status information indicates a fault or functional status for each link communicatively coupled between the compute node and any other compute node of the cluster.

Example 3 may include the subject matter of any of Examples 1-2, and may further include wherein, when the fault status information indicates that all of the links associated with the compute node have the faulty status, the logic is to cause the data packet not to be routed out of the compute node.

Example 4 may include the subject matter of any of Examples 1-3, and may further include wherein the determined particular output port is communicatively coupled to an input port of the egress compute node.

Example 5 may include the subject matter of any of Examples 1-4, and may further include wherein the determined particular output port is communicatively coupled to a second compute node of the cluster, wherein the second compute node is not the egress compute node.

Example 6 may include the subject matter of any of Examples 1-5, and may further include wherein the egress compute node comprises a particular compute node of the cluster having an output port that is to communicatively couple to a component external to the cluster.

Example 7 may include the subject matter of any of Examples 1-6, and may further include one or more receive network interface cards (NICs) in communication with the one or more processors, the one or more receive NICs is to determine a count of data packets incoming to the one or more input ports; and one or more transmit NICs in communication with the one or more processors, the one or more transmit NICs is to determine a count of data packets outgoing from the one or more output ports.

Example 8 may include the subject matter of any of Examples 1-7, and may further include wherein the one or more processors are to include fault detection logic, and wherein the fault detection logic is to determine a fault or functional status of each link communicatively coupled between the compute node and any other compute node of the cluster based on a difference between the count of data packets incoming to the one or more input ports and the count of data packets outgoing from the one or more output ports.

Example 9 may include the subject matter of any of Examples 1-8, and may further include wherein the fault status is to be determined when the difference exceeds a threshold.

Example 10 may include the subject matter of any of Examples 1-9, and may further include wherein the one or more processors are to include data packet discard logic, and wherein, when an egress output port of the egress compute node is deemed to be in a fault state, the egress output port being associated with the destination information, the data packet discard logic is to generate an error message and discard the data packet instead of to route the data packet.

Example 11 may include the subject matter of any of Examples 1-10, and may further include wherein the error message comprises an Internet control message protocol (ICMP) Route unavailable message.

Example 12 may include the subject matter of any of Examples 1-11, and may further include wherein the data packet discard logic is to add the destination information associated with the discarded data packet to a filter list to prevent future data packets having the same destination information from being accepted in the compute node.

Example 13 may include the subject matter of any of Examples 1-12, and may further include wherein the cluster comprises a software-based router.

Example 14 is a computerized method including, in response to receiving a data packet at a first compute node of a cluster of compute nodes, determining whether an external output port of an egress compute node of the cluster associated with destination identified in the data packet is in a fault state; and when the external output port of the egress compute node of the cluster is determined not to be in the fault state, determining a particular output port of one or more output ports of the first compute node to which the data packet received at the first compute node is to be routed to a second compute node of the cluster based on the external output port being associated with the destination identified in the data packet and fault status information being associated with links communicatively coupled between respective output port of the one or more output ports and respective compute node of the cluster.

Example 15 may include the subject matter of Example 14, and may further include wherein determining the particular output port comprises avoiding output ports of the one or more output ports associated with links indicated in the fault status information as having a fault status to be the particular output port to which the data packet is to be routed.

Example 16 may include the subject matter of any of Examples 14-15, and may further include, when the external output port of the egress compute node of the cluster is determined to be in the fault state, generating and transmitting an error message to a component outside of the cluster that sent the data packet to the first compute node; discarding the data packet to prevent being routed out of the first compute node; and updating a filter out list associated with a network interface card (NIC) of the first compute node to include the destination identified in the data packet.

Example 17 may include the subject matter of any of Examples 14-16, and may further include wherein the error message comprises an Internet control message protocol (ICMP) Route unavailable message.

Example 18 may include the subject matter of any of Examples 14-17, and may further include wherein updating the filter out list is to prevent future data packets having the same destination information as the destination identified in the data packet from being accepted in the first compute node.

Example 19 may include the subject matter of any of Examples 14-18, and may further include wherein the fault status information indicates a fault or functional status for each link communicatively coupled between the first compute node and any other compute node of the cluster.

Example 20 may include the subject matter of any of Examples 14-19, and may further include obtaining a count of incoming data packets at one or more input ports of the first compute node and a count of outgoing data packets at the one or more output ports of the first compute node; determining a difference between the count of incoming data packets to the count of outgoing data packets; when the difference exceeds a threshold, detecting a fault associated with the first compute node; and updating the fault status information with the detected fault.

Example 21 may include the subject matter of any of Examples 14-20, and may further include, when the difference does not exceed the threshold, detecting no fault associated with the first compute node; and updating the fault status information with the detection of no fault.

Example 22 is an apparatus including a first compute node of a cluster of compute nodes; and a second compute node of the cluster communicatively coupled to the first compute node; wherein the first compute node includes logic to determine a particular first output port, of one or more first output ports of the first compute node, to which a data packet received at the first compute node is to be routed within the cluster based on destination information included in the data packet, an egress compute node to comprise the second compute node being associated with the destination information in a routing table, and fault status information being associated with links communicatively coupled between respective first output port of the one or more first output ports and respective compute node of remaining compute nodes of the cluster, and wherein the logic is to exclude output ports associated with links indicated in the fault status information as having a fault status to be the particular first output port to which the data packet is to be routed.

Example 23 may include the subject matter of Example 22, and may further include wherein the fault status information indicates a fault or functional status for each link communicatively coupled between the first compute node and any other compute node of the cluster.

Example 24 may include the subject matter of any of Examples 22-23, and may further include wherein, when the fault status information indicates that all of the links associated with the first compute node have the faulty status, the logic is to cause the data packet not to be routed out of the first compute node.

Example 25 may include the subject matter of any of Examples 22-24, and may further include wherein the determined particular first output port is communicatively coupled to an input port of the second compute node.

Example 26 may include the subject matter of any of Examples 22-25, and may further include wherein the determined particular first output port is communicatively coupled to a third compute node of the cluster, and the third compute node is communicatively coupled to the second compute node.

Example 27 may include the subject matter of any of Examples 22-26, and may further include wherein the egress compute node comprises a particular compute node of the cluster having an output port that is to communicatively couple to a component external to the cluster.

Example 28 may include the subject matter of any of Examples 22-27, and may further include wherein the first compute node includes: one or more receive network interface cards (NICs) that determines a count of data packets incoming to the first compute node; and one or more transmit NICs that determines a count of data packets outgoing from the one or more first output ports.

Example 29 may include the subject matter of any of Examples 22-28, and may further include wherein the first compute node to include fault detection logic, and wherein the fault detection logic is to determine a fault or functional status of each link communicatively coupled between the first compute node and any other compute node of the cluster based on a difference between the count of data packets incoming to the first compute node and the count of data packets outgoing from the one or more first output ports.

Example 30 may include the subject matter of any of Examples 22-29, and may further include wherein the fault status is to be determined when the difference exceeds a threshold.

Example 31 may include the subject matter of any of Examples 22-30, and may further include wherein the first compute node to include data packet discard logic, and wherein, when an egress output port of the egress compute node is deemed to be in a fault state, the egress output port being associated with the destination information, the data packet discard logic is to generate an Internet control message protocol (ICMP) Route unavailable message and discard the data packet instead of to route the data packet.

Example 32 is one or more computer-readable storage medium comprising a plurality of instructions to cause a first compute node of a cluster of compute nodes, in response to execution by one or more processors of the first compute node of the cluster of compute nodes, to perform including, upon receipt of a data packet at the first compute node, determine whether an external output port of an egress compute node of the cluster associated with destination identified in the data packet is in a fault state; when the external output port of the egress compute node of the cluster is determined not to be in the fault state, determine a particular output port of one or more output ports of the first compute node to which the data packet received at the first compute node is to be routed to a second compute node of the cluster based on the external output port being associated with the destination identified in the data packet and fault status information being associated with links communicatively coupled between respective output port of the one or more output ports and respective compute node of the cluster; and when the external output port of the egress compute node of the cluster is determined to be in the fault state, discard the data packet without routing out of the first compute node.

Example 33 may include the subject matter of Example 32, and may further include wherein to determine the particular output port comprises to avoid output ports of the one or more output ports associated with links indicated in the fault status information as having a fault status to be the particular output port to which the data packet is to be routed.

Example 34 may include the subject matter of any of Examples 32-33, and may further include wherein the plurality of instructions, in response to execution by the one or more processors of the first compute node, further cause to, when the external output port of the egress compute node of the cluster is determined to be in the fault state: generate and transmit an error message to a component outside of the cluster that sent the data packet to the first compute node; and update a filter list associated with a network interface card (NIC) of the first compute node to include the destination identified in the data packet.

Example 35 may include the subject matter of any of Examples 32-34, and may further include wherein the error message comprises an Internet control message protocol (ICMP) Route unavailable message.

Example 36 may include the subject matter of any of Examples 32-35, and may further include wherein to update the filter list is to prevent future data packets having the same destination as the destination identified in the data packet from being accepted in the first compute node.

Example 37 may include the subject matter of any of Examples 32-36, and may further include wherein the fault status information indicates a fault or functional status for each link communicatively coupled between the first compute node and any other compute node of the cluster.

Example 38 may include the subject matter of any of Examples 32-37, and may further include wherein the plurality of instructions, in response to execution by the one or more processors of the first compute node, further cause to: obtain a count of incoming data packets at one or more input ports of the first compute node and a count of outgoing data packets at the one or more output ports of the first compute node; determine a difference between the count of incoming data packets to the count of outgoing data packets; when the difference exceeds a threshold, detect a fault associated with the first compute node; and update the fault status information with the detected fault.

Example 39 may include the subject matter of any of Examples 32-38, and may further include wherein the plurality of instructions, in response to execution by the one or more processors of the first compute node, further cause to: when the difference does not exceed the threshold, detect no fault associated with the first compute node; and update the fault status information with the detection of no fault.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

We claim:

1. A compute node for cluster routing of data packets, the compute node comprising:
one or more input ports to receive data packets from first selected other ones of a cluster of compute nodes of a cluster router having the cluster of compute nodes that include the compute node;
one or more output ports to route data packets to second selected other ones of the cluster of compute nodes of the cluster router; and
one or more processors, wherein the one or more processors includes route selection logic to determine a particular output port, of the one or more output ports, to which a data packet received at the one or more input ports is to be routed, wherein the route selection logic is to determine the particular output port based on destination information associated with the data packet, an egress compute node of the cluster being associated with the destination information, and fault status information associated with links communicatively coupling respective output port or ports of the one or more output ports and respective other compute nodes of the cluster, the egress compute node being one of the other compute nodes of the cluster where the data packet egresses the cluster router, wherein the route selection logic, in determining the particular output port, is to exclude from consideration output port or ports of the one or more output ports associated with links indicated in the fault status information as having a fault status, and wherein the fault status of an output port is determined based at least in part on statistics associated with data packets incoming to the one or more input ports, and outgoing from the one or more output ports.

2. The compute node of claim 1, wherein, when the fault status information indicates that all of the links communicatively coupling respective output port or ports of the one or more output ports and respective other compute nodes of the cluster have the fault status, the route selection logic is arranged to cause the data packet not to be routed out of the compute node.

3. The compute node of claim 1, wherein the determined particular output port is communicatively coupled to an input port of the egress compute node, which is one of the second selected other ones of the cluster of compute nodes.

4. The compute node of claim 1, wherein the determined particular output port is communicatively coupled to one of the second selected other ones of the cluster of compute nodes, and the one compute node of the second selected other ones of the cluster of compute node is not the egress compute node.

5. The compute node of claim 1, wherein the one or more processors are to include data packet discard logic, and wherein, when an egress output port of the egress compute node is deemed to be in a fault state, the egress output port being associated with the destination information, the data packet discard logic is to generate an error message and discard the data packet.

6. The compute node of claim 1, wherein the cluster router is a software-based router.

7. The compute node of claim 1, further comprising:
one or more receive network interface cards (NICs) in communication with the one or more processors, the one or more receive NICs is to determine, for each of the first selected other ones of the cluster of compute nodes, a statistical count of data packets incoming to the one or more input ports from the particular compute node; and
one or more transmit NICs in communication with the one or more processors, the one or more transmit NICs is to determine, for each of the second selected other ones of the cluster of compute nodes, a statistical count of data packets outgoing from the one or more output ports to the particular other compute node.

8. The compute node of claim 7, wherein the one or more processors are to include fault detection logic, and wherein the fault detection logic is to determine a fault or functional status of a link communicatively coupling the compute node and one of the other compute nodes of the cluster, based on a difference between the statistical count of data packets incoming to the one or more input ports and the statistical count of data packets outgoing from the one or more output ports for the particular other compute node.

9. The compute node of claim 8, wherein the fault status is to be determined when the difference exceeds a threshold.

10. A computerized method for routing data packets, comprising:
in response to receiving a data packet at a first compute node of a cluster of compute nodes of a cluster router, determining, at the first compute node, whether an external output port of an egress compute node of the cluster associated with a destination identified in the data packet is in a fault state, the first compute node being communicatively coupled with other compute nodes of the cluster including the egress compute node, and the egress compute node being the compute node of the cluster where the data packet is to leave the cluster router for the destination; and
when the external output port of the egress compute node of the cluster is determined not to be in the fault state, determining, at the first compute node, a particular output port of one or more output ports of the first compute node to which the data packet received at the first compute node is to be used to route the data packet to a second compute node of the cluster, wherein determining the particular output port is based on the external output port associated with the destination identified in the data packet and fault status information associated with links communicatively coupling respective output port or ports of the one or more output ports of the first compute node with respective other compute nodes of the cluster, wherein the fault status of an output port is determined based at least in part on statistics associated with data packets incoming to one or more input ports of the first compute node, and outgoing from the one or more output ports of the first compute node.

11. The method of claim 10, wherein determining the particular output port comprises avoiding output port or ports of the one or more output ports associated with links indicated in the fault status information as having a fault status from being determined to be the particular output port.

12. The method of claim 10, further comprising:
when the external output port of the egress compute node of the cluster is determined to be in the fault state, generating and transmitting, by the first compute node, an error message to a component outside of the cluster router that sent the data packet;
discarding, by the first compute node, the data packet, to prevent the data packet from being routed out of the first compute node; and
updating, by the first compute node, a filter out list associated with a network interface card (NIC) of the first compute node to include the destination identified in the data packet.

13. The method of claim 12, wherein updating the filter out list is to prevent future data packets having the same destination information as the destination identified in the data packet from being accepted in the first compute node.

14. The method of claim 10, further comprising:
obtaining, for each of the other compute nodes of the cluster, by the first compute node, a statistical count of incoming data packets at the one or more input ports of the first compute node from the particular other compute node, and a statistical count of outgoing data packets at the one or more output ports of the first compute node to the particular other compute node;
determining, for each of the other compute nodes of the cluster, by the first compute node, a difference between the statistical count of incoming data packets to the statistical count of outgoing data packets;
when the difference exceeds a threshold for one of the other compute nodes of the cluster, detecting, by the first compute node, a fault associated with a link coupling the first compute node with the other compute node having the difference exceeding the threshold; and
updating, by the first compute node, the fault status information of the particular link to reflect the detected fault.

15. The method of claim 14, wherein:
when the difference does not exceed the threshold for one of the other compute nodes of the cluster, detecting, by the first compute node, no fault associated with the link coupling the first compute node with the other compute node having the difference not exceeding the threshold; and
updating, by the first compute node, the fault status information of the particular link to reflect the detection of no fault.

16. A cluster router for routing data packets, comprising:
a first compute node of a cluster of compute nodes; and
a second compute node of the cluster communicatively coupled to the first compute node;
wherein the first compute node includes route selection logic to determine a particular output port, of one or more first output ports of the first compute node, to which a data packet received at the first compute node is to be routed within the cluster, wherein the route selection logic is arranged to determine the particular output port based on destination information included in the data packet, an egress compute node associated with the destination information, and fault status information being associated with links communicatively coupling respective output port or ports of the one or more first output ports and respective other compute nodes of the cluster, the egress compute node being one of the other compute nodes of the cluster where the data packet egresses the cluster router, wherein the route selection logic, in determining the particular output port, is to exclude from consideration output port or ports of the one or more output ports associated with links indicated in the fault status information as having a fault status, and wherein the fault status of an output port is determined based at least in part on statistics associated with data packets incoming to one or more input ports of the first compute node, and outgoing from the one or more output ports of the first compute node.

17. The cluster router of claim 16, wherein the fault status information of each link indicates a fault or functional status for the particular link.

18. The cluster router of claim 16, wherein the first compute node further includes:
one or more receive network interface cards (NICs) that determines, for each of the other compute nodes of the cluster, a statistical count of data packets incoming to the first compute node from the particular other compute node; and
one or more transmit NICs that determines, or each of the other compute nodes of the cluster, a statistical count of data packets outgoing from the one or more first output ports to the particular other compute node.

19. The cluster router of claim 18, wherein the first compute node to include fault detection logic, and wherein the fault detection logic is to determine a fault or functional status of a link communicatively coupling the first compute node and one of the other compute nodes of the cluster based on a difference between the statistical count of data packets incoming to the first compute node and the statistical count of data packets outgoing from the one or more first output ports for the particular other compute node.

20. The cluster router of claim 18, wherein the fault status is to be determined when the difference exceeds a threshold.

21. One or more non-transitory computer-readable storage medium comprising a plurality of instructions to cause a first compute node of a cluster of compute nodes of a cluster router having the cluster of compute nodes including the first compute node, in response to execution by one or more processors of the first compute node of the cluster of compute nodes, to:

upon receipt of a data packet at the first compute node, determine whether an external output port of an egress compute node of the cluster router associated with a destination identified in the data packet is in a fault state, the egress compute node being one of the other compute nodes of the cluster where the data packet egresses the cluster router;

when the external output port of the egress compute node of the cluster is determined not to be in the fault state, determine a particular output port of one or more output ports of the first compute node to which the data packet received at the first compute node to route the data packet to a second compute node of the cluster, wherein determination of the particular output port is based on the external output port being associated with the destination identified in the data packet, and fault status information associated with links communicatively coupling respective output port or ports of the one or more output ports and respective other compute nodes of the cluster, wherein the fault status of an output port is determined based at least in part on statistics associated with data packets incoming to one or more input ports of the first compute node, and outgoing from the one or more output ports of the first compute node; and when the external output port of the egress compute node of the cluster is determined to be in the fault state, discard the data packet without routing the data packet out of the first compute node.

22. The non-transitory computer-readable storage medium of claim 21, wherein to determine the particular output port comprises to avoid output port or ports of the one or more output ports associated with links indicated in the fault status information as having a fault status.

23. The non-transitory computer-readable storage medium of claim 21, wherein the plurality of instructions, in response to execution by the one or more processors of the first compute node, further cause the first compute node to, when the external output port of the egress compute node of the cluster is determined to be in the fault state:

generate and transmit an error message to a component outside of the cluster router that sent the data packet; and update a filter list associated with a network interface card (NIC) of the first compute node to include the destination identified in the data packet.

24. The non-transitory computer-readable storage medium of claim 21, wherein the plurality of instructions, in response to execution by the one or more processors of the first compute node, further cause the first compute node to:

obtain, for each of the other compute nodes, a statistical count of incoming data packets at the one or more input ports of the first compute node from the particular compute node, and a statistical count of outgoing data packets at the one or more output ports of the first compute node to the particular compute node;

determine, for each of the other compute nodes, a difference between the statistical count of incoming data packets of the particular compute node to the statistical count of outgoing data packets of the particular compute node;

when the difference exceeds a threshold, detect a fault associated with a link coupling the first compute node with the particular compute node; and update the fault status information of the link to reflect the detected fault.

25. The non-transitory computer-readable storage medium of claim 24, wherein the plurality of instructions, in response to execution by the one or more processors of the first compute node, further cause first compute node to:

when the difference does not exceed the threshold, detect no fault associated with a link coupling the first compute node with the particular compute node; and update the fault status information of the link to reflect the detection of no fault.

\* \* \* \* \*

UNITED STATES PATENT AND TRADEMARK OFFICE
CERTIFICATE OF CORRECTION

PATENT NO. : 10,938,712 B2  
APPLICATION NO. : 15/433758  
DATED : March 2, 2021  
INVENTOR(S) : Ken Schumm et al.

It is certified that error appears in the above-identified patent and that said Letters Patent is hereby corrected as shown below:

In the Claims

Column 24
Line 64, Claim 18 "...determines, or..." should read – "...determines, for..."

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*